(12) United States Patent
Omiya et al.

(10) Patent No.: US 12,476,363 B2
(45) Date of Patent: Nov. 18, 2025

(54) REFLECTION CHARACTERISTIC ANALYSIS DEVICE, REFLECTION CHARACTERISTIC ANALYSIS METHOD, AND REFLECTION CHARACTERISTIC ANALYSIS PROGRAM

(71) Applicant: NTT, Inc., Tokyo (JP)

(72) Inventors: Riku Omiya, Musashino (JP); Masashi Iwabuchi, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 146 days.

(21) Appl. No.: 18/290,806

(22) PCT Filed: Aug. 3, 2021

(86) PCT No.: PCT/JP2021/028831
§ 371 (c)(1),
(2) Date: Jan. 22, 2024

(87) PCT Pub. No.: WO2023/012905
PCT Pub. Date: Feb. 9, 2023

(65) Prior Publication Data
US 2025/0096463 A1   Mar. 20, 2025

(51) Int. Cl.
*H01Q 15/14* (2006.01)
*H01Q 3/46* (2006.01)

(52) U.S. Cl.
CPC .................... *H01Q 3/46* (2013.01)

(58) Field of Classification Search
CPC .............. H01Q 3/46; H01Q 15/147
See application file for complete search history.

(56) References Cited

U.S. PATENT DOCUMENTS 8,285,219 B2 * 10/2012 Sato ............... G01S 5/0273
455/67.11
2008/0077367 A1 * 3/2008 Odajima ........... G06F 30/23
703/2
(Continued)

FOREIGN PATENT DOCUMENTS

JP    2010-268254 A    11/2010

OTHER PUBLICATIONS

"Verification of pyramidal absorber, electromagnetic anechoic chamber analysis of ray-tracing method by searching for optimal reflection point of 3GHz pyramidal absorber", Kozo Keikaku Engineering Co., Ltd., Available Online at: https://network.kke.co.jp/consulting_samples/anechoic_chamber/task.shtml, Retrieved on Jul. 6, 2021, 10 pages including English Translation.
(Continued)

*Primary Examiner* — Awat M Salih
(74) *Attorney, Agent, or Firm* — XSENSUS LLP

(57) ABSTRACT

A reflection characteristic analysis device analyzes reflection characteristics of a reconfigurable intelligent surface (RIS: Reconfigurable Intelligent Surface). The reflection characteristic analysis device includes a ray trace calculation unit and an electromagnetic field analysis unit. The ray trace calculation unit calculates an incident angle of an electromagnetic wave incident on the reconfigurable intelligent surface by a ray-tracing method. The electromagnetic field analysis unit acquires the incident angle calculated by the ray trace calculation unit, and calculates, based on an electromagnetic field analysis, the reflection characteristics obtained when the electromagnetic wave enters the reconfigurable intelligent surface at the incident angle.

6 Claims, 6 Drawing Sheets

(56) References Cited

U.S. PATENT DOCUMENTS

2010/0291878 A1   11/2010  Sato et al.
2022/0021125 A1*  1/2022   Baligh ................... H01Q 21/06

OTHER PUBLICATIONS

Sarkar et al., "An Electromagnetic Framework for the Deployment of Reconfigurable Intelligent Surfaces to Control Massive MIMO Channel Characteristics", 2020 14th European Conference on Antennas and Propagation (EuCAP), Mar. 15, 2020, 6 pages.

* cited by examiner

REFLECTION CHARACTERISTIC ANALYSIS DEVICE, REFLECTION CHARACTERISTIC ANALYSIS METHOD, AND REFLECTION CHARACTERISTIC ANALYSIS PROGRAM

CROSS-REFERENCE TO RELATED APPLICATION

The present application is based on PCT filing PCT/JP2021/028831, filed Aug. 3, 2021, the entire contents of which are incorporated herein by reference.

TECHNICAL FIELD

The present disclosure relates to a technique for analyzing reflection characteristics of a reconfigurable intelligent surface (RIS: Reconfigurable Intelligent Surface).

BACKGROUND ART

A reconfigurable intelligent surface used for wireless communication is known. The reconfigurable intelligent surface is composed of a large number of reflection elements and reflects an incident radio wave. The reflection characteristics such as a reflection direction of the reconfigurable intelligent surface can be dynamically controlled. By utilizing such a reconfigurable intelligent surface, a propagation path bypassing an obstacle can be formed, and a plurality of propagation paths can be formed for a single terminal device. This will improve communication performance, such as communication quality and the number of spatial multiplexes.

NPL 1 discloses a method for analyzing a radio wave propagation characteristics in an electromagnetic anechoic chamber including a pyramidal absorber by means of a ray-tracing method. In the normal ray-tracing method, the influence of the amount of absorption by the absorber other than the normal reflection direction cannot be considered. Therefore, the amount of absorption in all directions other than the normal reflection direction of the absorber is calculated in advance by electromagnetic field analysis. Thereafter, the radio wave propagation characteristics are analyzed by the ray-tracing method in consideration of paths other than the normal reflection direction.

CITATION LIST

Non Patent Literature

[NPL 1] "Verification of pyramidal absorber, electromagnetic anechoic chamber analysis of ray-tracing method by searching for optimal reflection point of 3 GHz pyramidal absorber," Kozo Keikaku Engineering Co., Ltd. (https://network.kke.co.jp/consulting_samples/anechoic_chamber/task.shtml)

SUMMARY OF INVENTION

Technical Problem

Analyzing reflection characteristics of a reconfigurable intelligent surface is considered. In the case of a reconfigurable intelligent surface, an incident angle and a reflection angle of a radio wave are not necessarily equal to each other. Therefore, electromagnetic field analysis may be used for calculating a reflection angle with respect to an incident angle. However, the electromagnetic field analysis for the reconfigurable intelligent surface is time consuming. For example, the electromagnetic field analysis for a single incident angle takes approximately one hour. Therefore, it takes an enormous amount of calculation time to calculate all reflection angles with respect to all incident angles in all directions.

An object of the present disclosure is to provide a technique capable of reducing a calculation time without deteriorating analysis accuracy when analyzing reflection characteristics of a reconfigurable intelligent surface.

Solution to Problem

A first aspect relates to a reflection characteristic analysis device for analyzing reflection characteristics of a reconfigurable intelligent surface.

The reflection characteristic analysis device includes:
a ray trace calculation unit configured to calculate an incident angle of an electromagnetic wave incident on the reconfigurable intelligent surface by a ray-tracing method; and
an electromagnetic field analysis unit configured to acquire the incident angle calculated by the ray trace calculation unit, and to calculate, based on an electromagnetic field analysis, the reflection characteristics obtained when the electromagnetic wave enters the reconfigurable intelligent surface at the incident angle.

A second aspect relates to a reflection characteristic analysis device for analyzing reflection characteristics of a reconfigurable intelligent surface.

The reflection characteristic analysis device includes one or more processors.

The one or more processors are configured to execute:
first processing that calculates an incident angle of an electromagnetic wave incident on the reconfigurable intelligent surface by a ray-tracing method; and
second processing that acquires the incident angle calculated by the first processing and calculates, based on an electromagnetic field analysis, the reflection characteristics obtained when the electromagnetic wave enters the reconfigurable intelligent surface at the incident angle.

A third aspect relates to a reflection characteristic analysis method for analyzing reflection characteristics of a reconfigurable intelligent surface.

The reflection characteristic analysis method includes:
first processing that calculates an incident angle of an electromagnetic wave incident on the reconfigurable intelligent surface by a ray-tracing method; and
second processing that acquires the incident angle calculated by the first processing and calculates, based on an electromagnetic field analysis, the reflection characteristics obtained when the electromagnetic wave enters the reconfigurable intelligent surface at the incident angle.

A fourth aspect relates to a reflection characteristic analysis program executed by a computer. The reflection characteristic analysis program causes the computer to execute the reflection characteristic analysis method described above. Alternatively, the reflection characteristic analysis program causes the computer to realize the reflection characteristic analysis device described above.

Advantageous Effects of Invention

According to the present disclosure, the incident angle of the electromagnetic wave incident on the reconfigurable intelligent surface is calculated by the ray-tracing method prior to execution of the electromagnetic field analysis. Then, the electromagnetic field analysis is performed with regard to the incident angle calculated in advance to calculate the reflection characteristics of the reconfigurable intelligent surface. Since it is not necessary to perform the electromagnetic field analysis with regard to incident angles in all directions, the calculation time is greatly reduced. Moreover, since each incident angle of the electromagnetic wave incident on the reconfigurable intelligent surface is used, the analysis accuracy is not deteriorated. That is, it is possible to reduce the calculation time without deteriorating the analysis accuracy when analyzing the reflection characteristics of the reconfigurable intelligent surface.

DESCRIPTION OF EMBODIMENTS

Embodiments of the present disclosure will be described with reference to the accompanying drawings.

1. Overview

A reconfigurable intelligent surface (RIS: Reconfigurable Intelligent Surface) used for wireless communication is composed of a number of reflection elements and reflects an incident radio wave. Reflection characteristics such as a reflection direction of the reconfigurable intelligent surface can be dynamically controlled. For example, the reconfigurable intelligent surface is a meta-surface reflector. By utilizing such a reconfigurable intelligent surface, a propagation path bypassing an obstacle can be formed, and a plurality of propagation paths can be formed for a single terminal device. This will improve communication performance, such as communication quality and the number of spatial multiplexes.

In the following description, a reconfigurable intelligent surface is referred to as "RIS." The present embodiment provides a technique for analyzing the reflection characteristics of the RIS.

Figure 1:
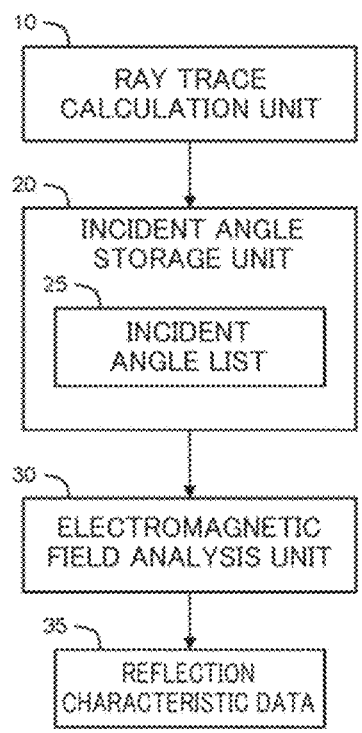
FIG. 1 is a block diagram showing an example of a functional configuration of a reflection characteristic analysis device according to an embodiment of the present disclosure.

FIG. 1 is a block diagram showing an example of a functional configuration of a reflection characteristic analysis device 1 according to the present embodiment. The reflection characteristic analysis device 1 analyzes the reflection characteristics of the RIS. The reflection characteristic analysis device 1 includes, as functional blocks, a ray trace calculation unit 10, an incident angle storage unit 20, and an electromagnetic field analysis unit 30.

Figure 2:
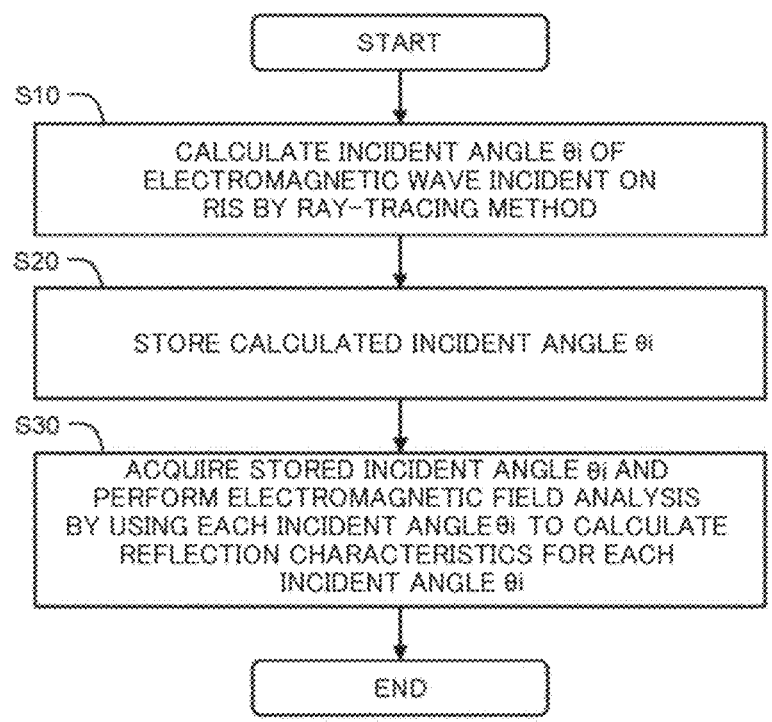
FIG. 2 is a flowchart showing processing performed by the reflection characteristic analysis device according to an embodiment of the present disclosure.

FIG. 2 is a flowchart showing processing performed by the reflection characteristic analysis device 1 according to the present embodiment.

Figure 3:
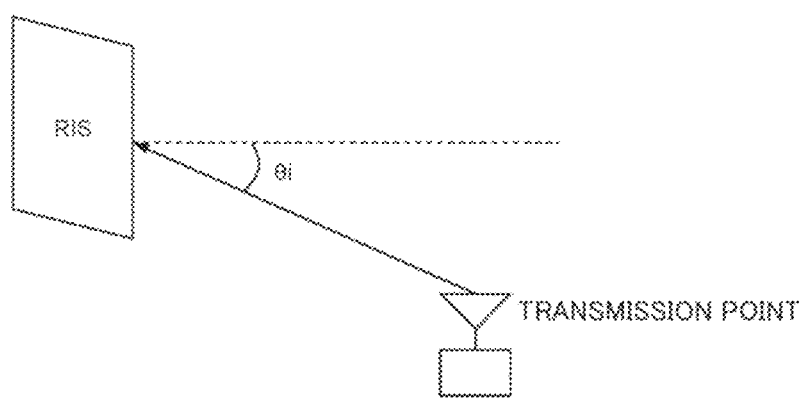
FIG. 3 is a conceptual diagram for explaining processing performed by the reflection characteristic analysis device according to an embodiment of the present disclosure.

First, in Step S10 (first processing), the ray trace calculation unit 10 calculates an incident angle $\theta_i$ of an electromagnetic wave incident on the RIS by a ray-tracing method. FIG. 3 is a conceptual diagram for explaining Step S10. The ray trace calculation unit 10 calculates one or more rays (incident paths) incident on the RIS from a transmission point, on the basis of the ray-tracing method, and calculates the incident angle $\theta_i$ of each ray to the RIS.

In the subsequent Step S20, the incident angle storage unit 20 stores (memorizes) an incident angle list 25 indicating one or more incident angles $\theta_i$ calculated by the ray trace calculation unit 10.

Figure 4:
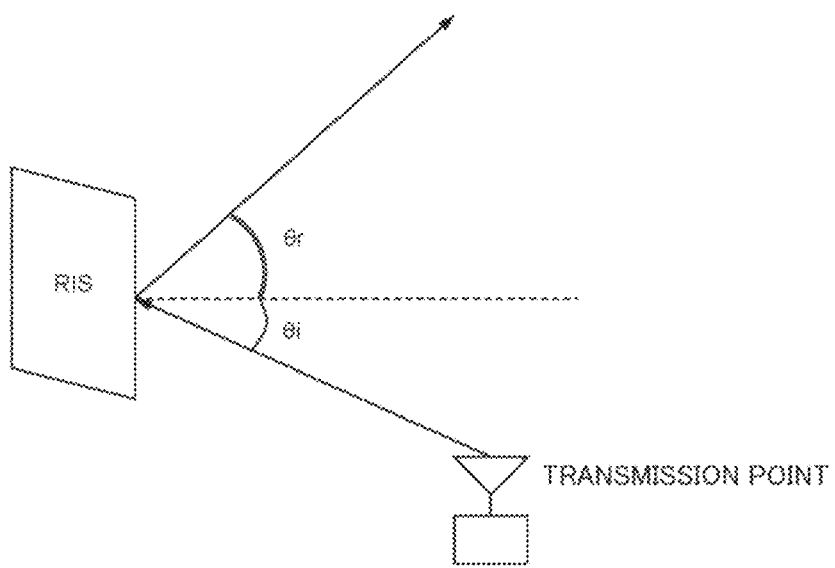
FIG. 4 is a conceptual diagram for explaining processing performed by the reflection characteristic analysis device according to an embodiment of the present disclosure.

Thereafter, in Step S30 (second processing), the electromagnetic field analysis unit 30 acquires the incident angle list 25 stored in the incident angle storage unit 20. Then, the electromagnetic field analysis unit 30 performs electromagnetic field analysis by using not incident angles of all directions but only the incident angle $\theta_i$ listed in the incident angle list 25, to calculate reflection characteristics. More specifically, the electromagnetic field analysis unit 30 calculates, based on the electromagnetic field analysis, the reflection characteristics obtained when the electromagnetic wave enters the RIS at each incident angle $\theta_i$. The electromagnetic field analysis is performed by, for example, an FDTD (Finite Difference Time Domain) method. FIG. 4 is a conceptual diagram for explaining Step S30. The electromagnetic field analysis unit 30 performs the electromagnetic field analysis on the electromagnetic wave incident at the incident angle $\theta_i$, to calculate a reflection angle $\theta_r$ with respect to the incident angle $G_i$ on the basis of the result of the electromagnetic field analysis. The electromagnetic field analysis unit 30 outputs reflection characteristic data 35 indicating the reflection characteristics of the RIS thus calculated.

As described above, according to the present embodiment, the incident angle $G_i$ of the electromagnetic wave incident on the RIS is calculated by the ray-tracing method prior to the execution of the electromagnetic field analysis. Then, the electromagnetic field analysis is performed with regard to only the incident angle $\theta_i$ calculated in advance to calculate the reflection characteristics of the RIS. Since it is not necessary to perform the electromagnetic field analysis with regard to incident angles in all directions, the calculation time is greatly reduced. Moreover, since each incident angle $\theta_i$ of the electromagnetic wave incident on the RIS is used, the analysis accuracy is not deteriorated. That is, according to the present embodiment, it is possible to reduce the calculation time without deteriorating the analysis accuracy when analyzing the reflection characteristics of the RIS.

2. Specific Examples

Figure 5:
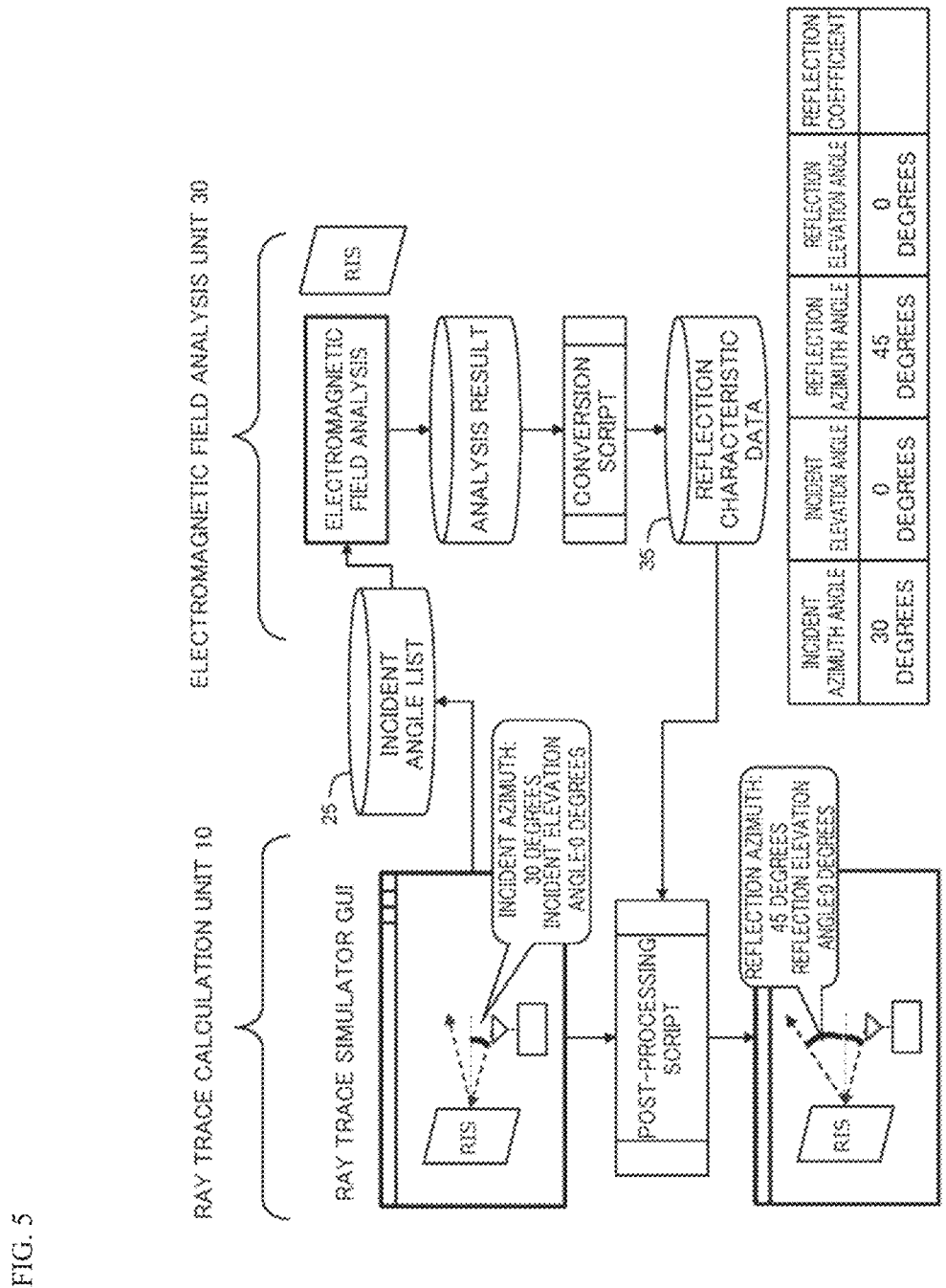
FIG. 5 is a conceptual diagram showing an example of processing performed by the reflection characteristic analysis device according to an embodiment of the present disclosure.

FIG. 5 is a conceptual diagram showing an example of processing performed by the reflection characteristic analysis device 1 according to the present embodiment.

The ray trace calculation unit 10 calculates the incident angle $\theta_i$ of an electromagnetic wave incident on the RIS by the ray-tracing method. The incident angle $\theta_i$ is defined by, for example, a combination of an incident azimuth angle and an incident elevation angle. For example, the incident azimuth angle of a certain incident angle θi is 30 degrees, and the incident elevation angle thereof is 0. The incident angle list 25 indicates one or more incident angles θi calculated by the ray trace calculation unit 10.

The electromagnetic field analysis unit 30 performs the electromagnetic field analysis by using the incident angle θi listed in the incident angle list 25. The electromagnetic field analysis unit 30 (conversion script) calculates the reflection angle θr with respect to the incident angle θi on the basis of the result of the electromagnetic field analysis. The reflection angle θr is defined by, for example, a combination of a reflection azimuth angle and a reflection elevation angle. For example, a reflection angle θr with a reflection azimuth angle θ=45 degrees and a reflection elevation angle=0 degrees is calculated with respect to the incident angle θi with the incident azimuth angle=30 degrees and the incident elevation angle=0 degrees. The reflection characteristic data 35 indicates the reflection characteristics of the RIS thus calculated. For example, the reflection characteristic data 35 indicates the correspondence relationship between the incident angle θi and the reflection angle θr. The reflection characteristic data 35 may further include a reflection coefficient.

The reflection characteristic data 35 may be fed back to the ray trace calculation unit 10 and reflected on the ray trace. For example, the ray trace calculation unit 10 rewrites the reflection angle θr of the electromagnetic wave (ray) at the RIS with the reflection angle θr indicated by the reflection characteristic data 35. Thus, the ray trace calculation unit 10 calculates radio wave propagation characteristics in an environment including the RIS by the ray-tracing method, based on the reflection characteristic data 35.

3. Hardware Configuration Example

Figure 6:
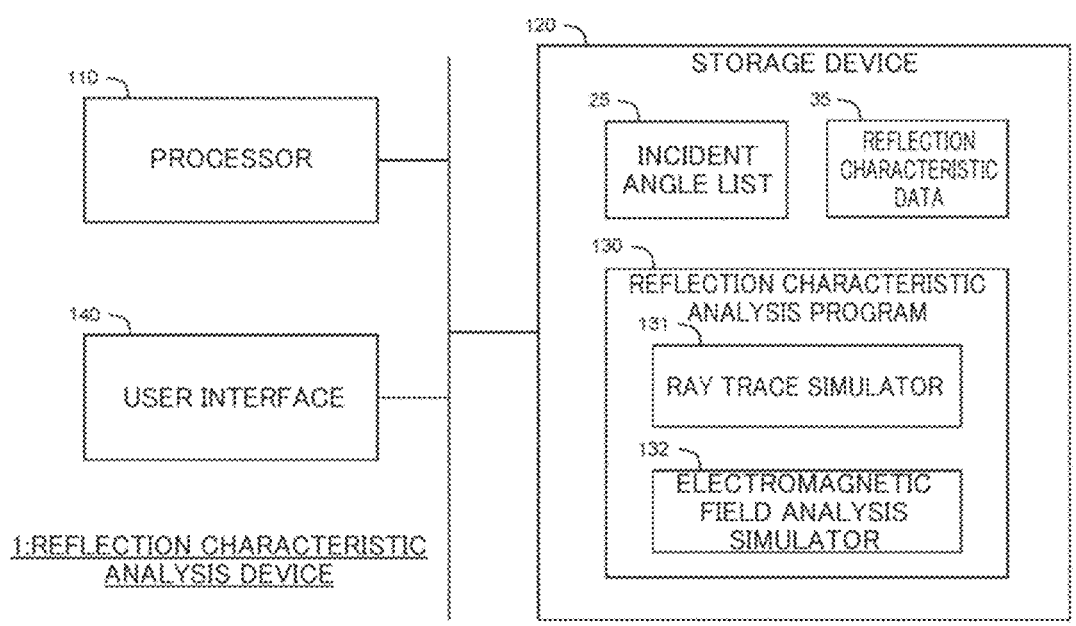
FIG. 6 is a block diagram showing an example of a hardware configuration of the reflection characteristic analysis device according to an embodiment of the present disclosure.

FIG. 6 is a block diagram showing an example of a hardware configuration of the reflection characteristic analysis device 1 according to the present embodiment. The reflection characteristic analysis device 1 is a computer that includes one or more processors 110 (hereinafter simply referred to as a "processor 110"), one or more storage devices 120 (hereinafter simply referred to as a "storage device 120"), and a user interface 140.

The processor 110 executes a variety of information processing. The processor 110 includes, for example, a CPU (Central Processing Unit).

The storage device 120 stores a variety of information necessary for the processing performed by the processor 110 and a variety of information generated as a result of the processing performed by the processor 110. For example, the storage device 120 stores the incident angle list 25, the reflection characteristic data 35, and the like. Examples of the storage device 120 include a volatile memory, a nonvolatile memory, an HDD (Hard Disk Drive), and an SSD (Solid State Drive). In addition, the incident angle storage unit 20 shown in FIG. 1 is implemented by, for example, the storage device 120.

A reflection characteristic analysis program 130 is a computer program (software) executed by the processor 110. The functions of the reflection characteristic analysis device 1 are implemented by the processor 110 executing the reflection characteristic analysis program 130. The reflection characteristic analysis program 130 is stored in the storage device 120. The reflection characteristic analysis program 130 may be recorded on a non-transitory computer-readable recording medium. The reflection characteristic analysis program 130 may be provided via a network.

More specifically, the reflection characteristic analysis program 130 includes a ray trace simulator 131 and an electromagnetic field analysis simulator 132. The ray trace simulator 131 is a three-dimensional radio wave propagation simulator (e.g., RapLab) for performing the ray-tracing. The electromagnetic field analysis simulator 132 is a three-dimensional electromagnetic field simulator (e.g., XFdtd) for performing the electromagnetic field analysis. The ray trace calculation unit 10 shown in FIG. 1 is implemented by the processor 110 executing the ray trace simulator 131. In addition, the electromagnetic field analysis unit 30 shown in FIG. 1 is implemented by the processor 110 executing the electromagnetic field analysis simulator 132.

The user interface 140 receives an input from a user and presents a variety of information to the user. The user interface 140 includes an input device and a display device. Examples of the input device include a keyboard, a mouse, and a touch panel. The user operates the ray trace simulator 131 and the electromagnetic field analysis simulator 132 by using the input device. The simulation result is displayed on the display device.

REFERENCE SIGNS LIST

1 Reflection characteristic analysis device
10 Ray trace calculation unit
20 Incident angle storage unit
25 Incident angle list
30 Electromagnetic field analysis unit
35 Reflection characteristic data
110 Processor
120 Storage device
130 Reflection characteristic analysis program
131 Ray trace simulator
132 Electromagnetic field analysis simulator
140 User interface
RIS Reconfigurable intelligent surface

The invention claimed is:

1. A reflection characteristic analysis device for analyzing reflection characteristics of a reconfigurable intelligent surface, the reflection characteristic analysis device comprising:
   processing circuitry configured to execute:
   first processing that calculates an incident angle of an electromagnetic wave incident on the reconfigurable intelligent surface by a ray-tracing method; and
   second processing that acquires the incident angle calculated by the first processing and calculates, based on an electromagnetic field analysis, the reflection characteristics obtained when the electromagnetic wave enters the reconfigurable intelligent surface at the incident angle.

2. The reflection characteristic analysis device according to claim 1, further comprising:
   one or more storage devices configured to store the incident angle calculated by the first processing,
   wherein in the second processing, the processing circuitry acquires the incident angle stored in the one or more storage devices to calculate the reflection characteristics.

3. The reflection characteristic analysis device according to claim 1, wherein:
   the processing circuitry is further configured to calculate radio wave propagation characteristics in an environment including the reconfigurable intelligent surface by a ray-tracing method, based on the reflection characteristics calculated by the second processing.

4. A reflection characteristic analysis method for analyzing reflection characteristics of a reconfigurable intelligent surface, the reflection characteristic analysis method comprising:

first processing that calculates an incident angle of an electromagnetic wave incident on the reconfigurable intelligent surface by a ray-tracing method; and second processing that acquires the incident angle calculated by the first processing and calculates, based on an electromagnetic field analysis, the reflection characteristics obtained when the electromagnetic wave enters the reconfigurable intelligent surface at the incident angle.

5. The reflection characteristic analysis method according to claim 4, further comprising:

storing the incident angle calculated by the first processing in one or more storage devices, wherein the second processing includes acquiring the incident angle stored in the one or more storage devices to calculate the reflection characteristics.

6. A non-transitory computer-readable recording medium storing a reflection characteristic analysis program for analyzing reflection characteristics of a reconfigurable intelligent surface, the reflection characteristic analysis program, when executed by a computer, causing the computer to execute:

first processing that calculates an incident angle of an electromagnetic wave incident on the reconfigurable intelligent surface by a ray-tracing method; and second processing that acquires the incident angle calculated by the first processing and calculates, based on an electromagnetic field analysis, the reflection characteristics obtained when the electromagnetic wave enters the reconfigurable intelligent surface at the incident angle.

* * * * *